(12) United States Patent
Nakamura et al.

(10) Patent No.: US 9,724,993 B2
(45) Date of Patent: Aug. 8, 2017

(54) HYBRID VEHICLE

(71) Applicant: NISSAN MOTOR CO., LTD., Yokohama-shi, Kanagawa (JP)

(72) Inventors: Hiroshi Nakamura, Kanagawa (JP); Takashi Awaihara, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/905,012

(22) PCT Filed: Jun. 23, 2014

(86) PCT No.: PCT/JP2014/066505
§ 371 (c)(1),
(2) Date: Jan. 14, 2016

(87) PCT Pub. No.: WO2015/008581
PCT Pub. Date: Jan. 22, 2015

(65) Prior Publication Data
US 2016/0137052 A1   May 19, 2016

(30) Foreign Application Priority Data
Jul. 18, 2013  (JP) .................................. 2013-149428

(51) Int. Cl.
*B60K 6/46*      (2007.10)
*B60K 5/12*      (2006.01)
*B60K 1/00*      (2006.01)
*B60K 6/40*      (2007.10)

(52) U.S. Cl.
CPC ................ *B60K 6/46* (2013.01); *B60K 1/00* (2013.01); *B60K 5/12* (2013.01); *B60K 6/40* (2013.01); *B60Y 2200/92* (2013.01); *B60Y 2300/20* (2013.01); *B60Y 2400/214* (2013.01); *Y02T 10/6217* (2013.01)

(58) Field of Classification Search
CPC ................................. B60K 5/12; B60K 5/1275
See application file for complete search history.

(56) References Cited

U.S. PATENT DOCUMENTS 4,449,603 A * 5/1984 Langwieder ............. B60K 5/04
                                                            180/232
6,736,448 B2 * 5/2004 Hanakawa ........... B62D 21/152
                                                            296/187.09

(Continued)

FOREIGN PATENT DOCUMENTS

JP    H02248735 A    10/1990
JP    H09272459 A    10/1997

(Continued)

*Primary Examiner* — Brian Swenson
(74) *Attorney, Agent, or Firm* — Young Basile Hanlon & MacFarlane, P.C.

(57) ABSTRACT

A driving unit and a power-generating unit are separately supported on a sub-frame in such a manner to isolate vibration and are spaced away from each other in a vehicle front-rear direction, to realize good noise/vibration control ability. With respect to an external input acting in the vehicle front-rear direction, a weakened part of a mount bracket extended over the power-generating unit to the driving unit induces and promotes a buckling distortion, to demonstrate good energy absorption ability.

6 Claims, 5 Drawing Sheets

(56) References Cited

U.S. PATENT DOCUMENTS

| | | | |
|---|---|---|---|
| 6,880,663 B2* | 4/2005 | Fujiki | B62D 21/155 |
| | | | 180/232 |
| 7,040,446 B2* | 5/2006 | Anzai | B60K 5/1275 |
| | | | 180/234 |
| 7,740,278 B2* | 6/2010 | Kakuta | B62D 3/12 |
| | | | 280/777 |
| 9,004,468 B2* | 4/2015 | Kamei | B60K 5/1241 |
| | | | 267/141.1 |
| 2002/0096384 A1 | 7/2002 | Yoshida et al. | |
| 2005/0212188 A1* | 9/2005 | Endo | F16F 1/3849 |
| | | | 267/141.2 |
| 2007/0051549 A1 | 3/2007 | Fukuda | |
| 2011/0180339 A1 | 7/2011 | Kawamura | |
| 2012/0312622 A1* | 12/2012 | Hoermandinger | B60K 5/04 |
| | | | 180/292 |

FOREIGN PATENT DOCUMENTS

| | | |
|---|---|---|
| JP | 2002211249 A | 7/2002 |
| JP | 2002274194 A | 9/2002 |
| JP | 2004161260 A | 6/2004 |
| JP | 2011148444 A | 8/2011 |
| JP | 2011148445 A | 8/2011 |
| JP | 2011201395 A | 10/2011 |
| JP | 2013035443 A | 2/2013 |

\* cited by examiner

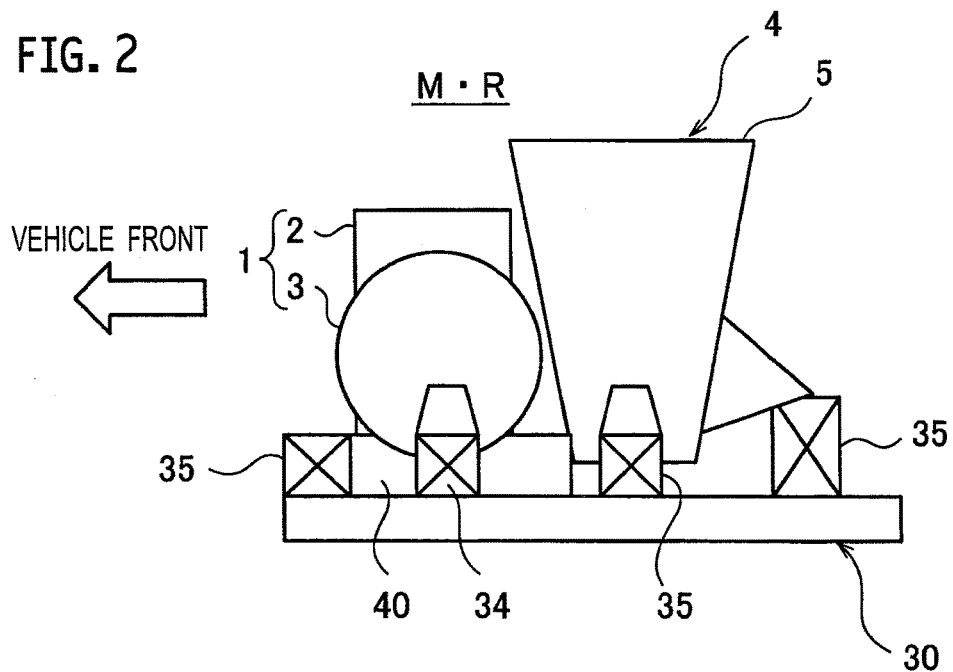
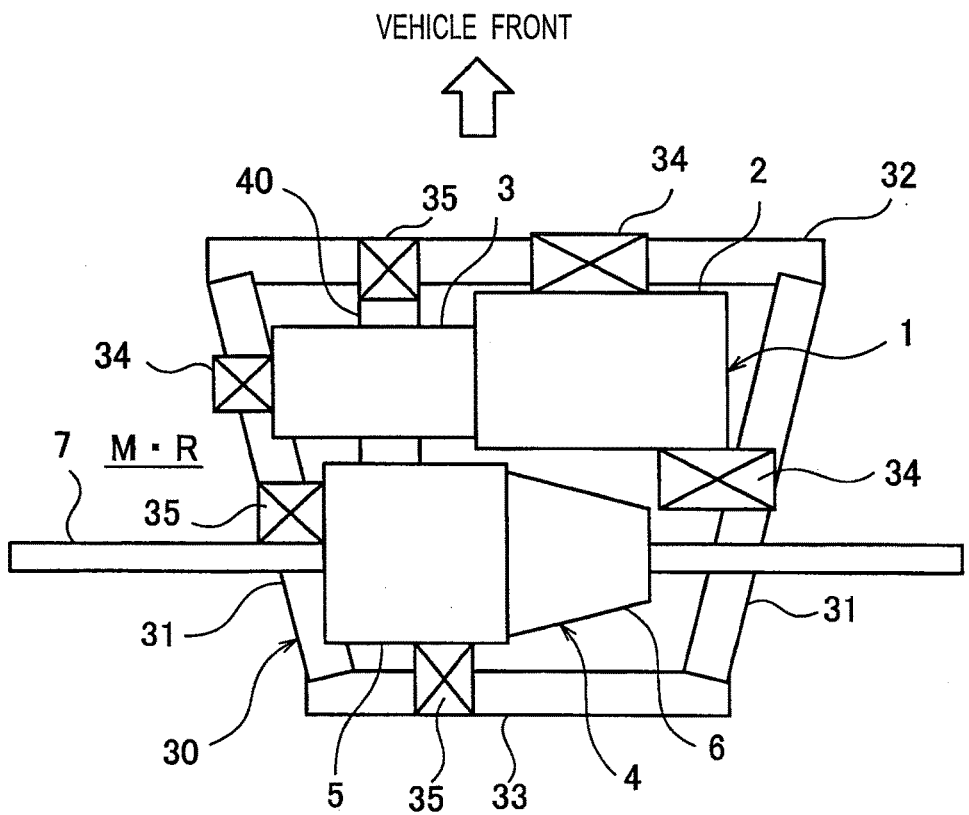

HYBRID VEHICLE

CROSS-REFERENCE TO RELATED APPLICATION(S)

This patent application claims priority to Japanese Patent Application No. 2013-149428 filed on Jul. 18, 2013, whose disclosed contents are incorporated herein by reference.

TECHNICAL FIELD

This disclosure relates to a series-type hybrid vehicle provided with a driving unit for driving the vehicle and a power-generating unit for generating electric power to drive the driving unit.

BACKGROUND

Japanese Unexamined Patent Application Publication No. 2011-201395 discloses a series-type hybrid vehicle with a driving unit and power-generating unit mounted in a motor room.

A series-type hybrid vehicle with a driving unit and power-generating unit mounted in a motor room is required to secure a good noise/vibration control ability on the driving and power-generating units which have their respective intrinsic vibration characteristics. Also required is a good energy absorption ability for collision.

SUMMARY

In consideration of the above-mentioned conditions, the present invention is able to provide a series-type hybrid vehicle having a good noise/vibration control ability and collision energy absorption ability.

According to a technical aspect of the present invention, the hybrid vehicle includes a driving unit that is powered by electric power as an energy source, is mounted in a motor room of the vehicle, and has an output shaft oriented in a vehicle width direction to output driving force for driving the vehicle, a power-generating unit that is arranged adjacent to one side of the driving unit, is spaced away from the same in a vehicle front-rear direction, and generates electric power for driving the driving unit, and a vehicle body member that separately supports the driving unit and power-generating unit in the motor room in such a manner to isolate vibration and allow pivotal motion of the units.

The driving unit is connected to a first end of a mount bracket that extends over the power-generating unit in the vehicle front-rear direction, a second end of the mount bracket being supported on a front or rear side of the vehicle body member to isolate vibration and allow pivotal motion.

The mount bracket has a weakened part that may induce a buckling distortion with respect to an external input acting in the vehicle front-rear direction.

BRIEF DESCRIPTION OF THE DRAWINGS

FIG. 2 is an explanatory side view schematically illustrating a mounted state of a driving unit and power-generating unit in a motor room.

FIG. 3 is an explanatory plan view of FIG. 2.

DETAILED DESCRIPTION

An embodiment of the present invention will be explained in detail with reference to the drawings.

Figure 1:
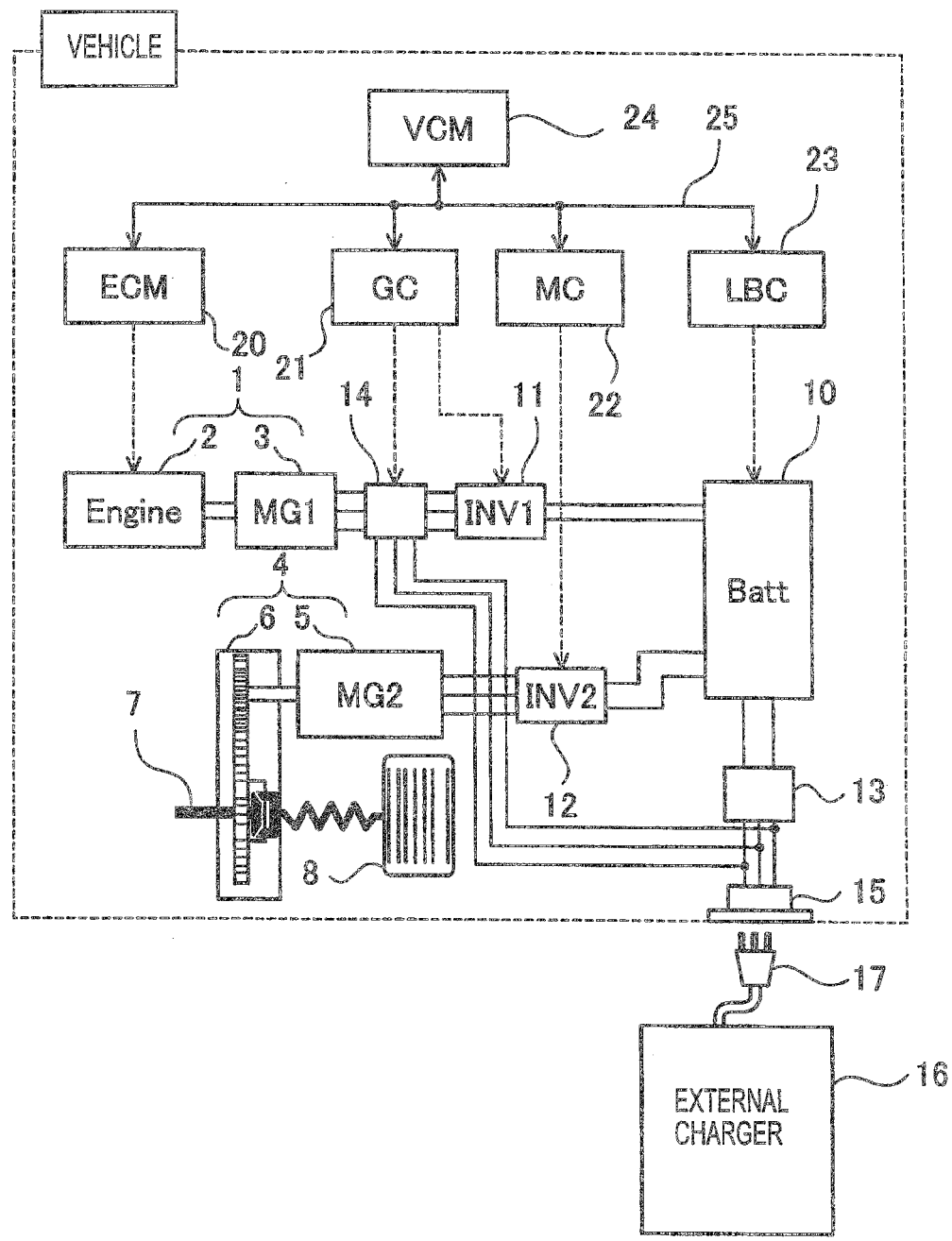
FIG. 1 is an explanatory view roughly illustrating an overall system of a hybrid vehicle according to the present invention.

FIG. 1 is an explanatory view simply illustrating a general system of a series-type plug-in hybrid vehicle as the hybrid vehicles to which the present invention is applied.

A driving system of the plug-in hybrid vehicle illustrated in FIG. 1 includes a power-generating unit 1 having an engine 2 and a power-generating motor 3, a driving unit 4 having a driving motor 5 and a reduction differential mechanism 6, a driving wheel 8 revolving with an output shaft 7 of the driving unit 4, a high-voltage battery 10, a power-generating motor inverter 11, a driving motor inverter 12, a charging converter 13, a switch 14, and a charging port 15.

This driving system is of a series type in which the engine 2 of the power-generating unit 1 drives the power-generating motor 3, the generated electric power is accumulated in the high-voltage battery 10, and the accumulated power is used to drive the driving motor 5. The vehicle runs only with the driving motor 5 serving as a driving source. Namely, the vehicle is an "electric vehicle (EV) equipped with an electric power generating system" whose running mode is only an EV running mode.

In response to a generation request, the engine 2 of the power-generating unit 1 is started by the directly coupled power-generating motor 3. After a complete explosion, power from the engine 2 is used to drive the power-generating motor 3 to generate electric power. When the generation request is changed to a non generation request, the engine 2 and power-generating motor 3 stop.

The power-generating motor 3 is a motor generator that is directly coupled with the engine 2 and demonstrates a motor function and generator function. The motor function is activated when a generation request is issued in an engine temporal-stop state and consumes power of the high-voltage battery 10 to start the engine 2 by cranking and igniting the engine 2. The generator function is activated in an engine operating state to convert rotational driving power of the engine 2 into three-phase AC power that is used to charge the high-voltage battery 10.

The driving motor 5 of the driving unit 4 is a motor generator that is connected through the output shaft 7 of the reduction differential mechanism 6 to the driving wheel 8 of the vehicle and demonstrates a motor function and a generator function. The motor function acts at the time of initial acceleration, constant-speed running, and intermediate acceleration and consumes power from the high-voltage battery 10 to drive the vehicle. The generator function acts at the time of deceleration or braking and converts rotational driving power of the driving wheel 8 into three-phase AC power that is used to charge the high-voltage battery 10 in a regenerative manner.

The high-voltage battery 10 is a lithium ion secondary battery, a high-capacity capacitor, or the like that accumulates power generated by the power-generating motor 3 or power regenerated by the driving motor 5 and supplies the accumulated power to the driving motor 5 and power-generating motor 3.

The power-generating motor inverter 11 is arranged between the power-generating motor 3 and the high-voltage battery 10 and converts three-phase AC and DC from one into the other. The three-phase AC is provided for the driving of and power generation by the power-generating motor 3 and the DC is for the charging and discharging of the high-voltage battery 10.

The driving motor inverter 12 is arranged between the driving motor 5 and the high-voltage battery 10 and converts three-phase AC and DC from one into the other. The three-phase AC is provided for the driving of and power generation by the driving motor 5 and the DC is for the charging and discharging of the high-voltage battery 10.

The charging converter 13 is arranged between the high-voltage battery 10 and the charging port 15, and during a plug-in charging operation, converts external AC power supplied through the charging port 15 into DC power to charge the high-voltage battery 10.

The switch 14 is arranged among the power-generating motor 3, power-generating motor inverter 11, and charging port 15 and switches a power generating path and a power supplying path from one to the other. The power generating path has a pattern of disconnecting the charging port 15 and connecting the power-generating motor 3 and power-generating motor inverter 11 to each other. The power supplying path has the following three patterns that are switched from one to another:

(i) a pattern of the power supplying path configured to disconnect the charging port 15 and connect the power-generating motor 3 and power-generating motor inverter 11 to each other to use power from the high-voltage battery 10;

(ii) a pattern of the power supplying path configured to connect the power-generating motor 3, power-generating motor inverter 11, and charging port 15 to one another to use power from both the charging port 15 and high-voltage battery 10; and (iii) a pattern of the power supplying path configured to disconnect the power-generating motor inverter 11 and connect the power-generating motor 3 and charging port 15 to each other to use power from the charging port 15.

The charging port 15 is set at a peripheral position of the vehicle body. When the vehicle is stopped at a location where an external charger 16 is set, a lid or the like is opened in the stopped state, and a power supply plug 17 of the external charger 16 is inserted and connected to the charging port 15 to charge (plug-in charge) the high-voltage battery 10 through the charging converter 13. The external charger 16 may be a charging system for domestic use that charges at home at low speed with the use of nighttime power, a high-speed charging stand that is away from home and is capable of charging at high speed, or the like.¥

A control system of the plug-in hybrid vehicle illustrated in FIG. 1 includes an engine controller 20, a generator controller 21, a motor controller 22, a battery controller 23, and an integrated vehicle controller 24. To share various kinds of data, these controllers 20, 21, 22, 23, and 24 are connected to one another through a CAN communication line 25 that exchanges information.

In an "EV running mode" in a key-ON state, the engine controller 20 controls, according to control instructions from the integrated vehicle controller 24, the intake air quantity, ignition timing, and fuel injection quantity of the engine 2, thereby controlling output torque.

In the "EV running mode" in the key-ON state, the generator controller 21 controls, according to control instructions from the integrated vehicle controller 24, the power-generating motor inverter 11, thereby controlling the input/output torque of the power-generating motor 3.

This generator controller 21 is a controller that continuously operates even if an ignition key is in an OFF state (i.e., a system OFF state) and measures a duration of an engine temporal-stop state over key-ON and -OFF states. According to the measured information on the engine stopped duration and other pieces of input information, it is determined whether or not conditions for starting an engine lubrication control are met. If the start conditions are met, a generating system starting process is carried out to start other necessary controllers, and thereafter, the engine lubrication control is carried out.

In the "EV running mode" in the key-ON state, the motor controller 22 controls, according to control instructions from the integrated vehicle controller 24, the driving motor inverter 12, thereby controlling the input/output torque of the driving motor 5.

In the "EV running mode" in the key-ON state, the battery controller 23 estimates internal state quantities such as the charging rate (charging capacity), possible input/output power, and the like of the high-voltage battery 10 and carries out protection control of the high-voltage battery 10.

In the "EV running mode" in the key-ON state, the integrated vehicle controller 24 makes, according to various kinds of shared data, the plurality of controllers 20, 21, 22, and 23 cooperate with one another, to control motor driving outputs in response to a driver's request. It also controls power generation outputs in view of both the drivability and fuel consumption (economy).

FIGS. 2 to 5 illustrate an example of a mounting structure for the power-generating unit 1 and driving unit 4. According to the embodiment, a motor room (MR) is set in a vehicle front part, and in the motor room, the power-generating unit 1 and driving unit 4 are mounted adjacent to each other in a vehicle front-rear direction.

At a lower part of the motor room MR, there is a sub-frame 30 serving as a strong skeletal member for a vehicle front area.

The sub-frame 30 includes a pair of left and right side members 31 extending in the vehicle front-rear direction and a front cross member 32 and rear cross member 33 that connect front and rear ends of the side members 31 to each other, to form a frame of nearly square shape.

Mounted on the sub-frame 30 and oriented laterally are the power-generating unit 1 in which the engine 2 and power-generating motor 3 are connected to each other and the driving unit 4 in which the driving motor 5 and reduction differential mechanism 6 are connected to each other. The output shaft 7 connected to the reduction differential mechanism 6 of the driving unit 4 is arranged in a vehicle width direction.

According to the illustrated example, the power-generating unit 1 is mounted on a front side of the sub-frame 30, i.e., in the vicinity of the front cross member 32 and the driving unit 4 is mounted on a rear side of the sub-frame 30, i.e., in the vicinity of the rear cross member 33 so that the driving unit 4 is behind and adjacent to the power-generating unit 1 with a predetermined space between the units 1 and 4 (refer to FIGS. 2 and 3).

Independent Vibration Isolation Mechanism

These power-generating unit 1 and driving unit 4 are separately supported on the sub-frame 30 to each prevent vibration and allow pivotal motion of the units.

Figure 5:
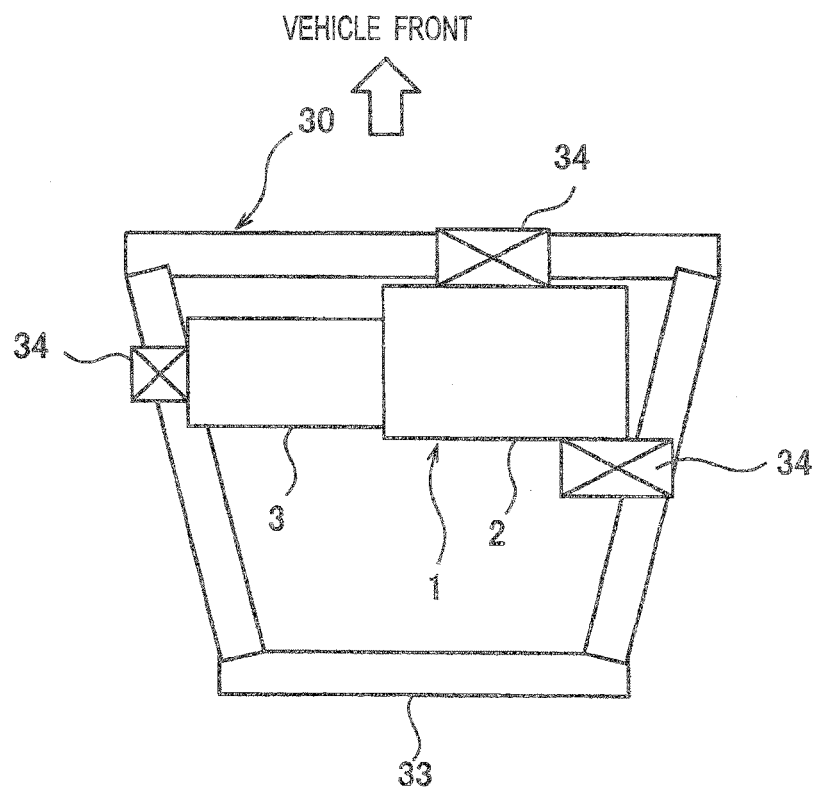
FIG. 5 is an explanatory plan view schematically illustrating the mounted state of the power-generating unit of FIG. 3.

As also illustrated in FIG. 5, the power-generating unit 1 is supported at three points through mount members 34 each having a vibration insulator. The three points are on the front cross member 32 and the pair of left and right side members 31 of the sub-frame 30, respectively.

According to the example illustrated in FIGS. 3 and 5, front and right-rear sides of the engine 2 are supported through the mount members 34 on the front cross member 32 and right side member 31 in a vibration insulation manner. A left side of the power-generating motor 3 is supported through the mount member 34 on the left side member 31 in a vibration insulation manner.

Figure 4:
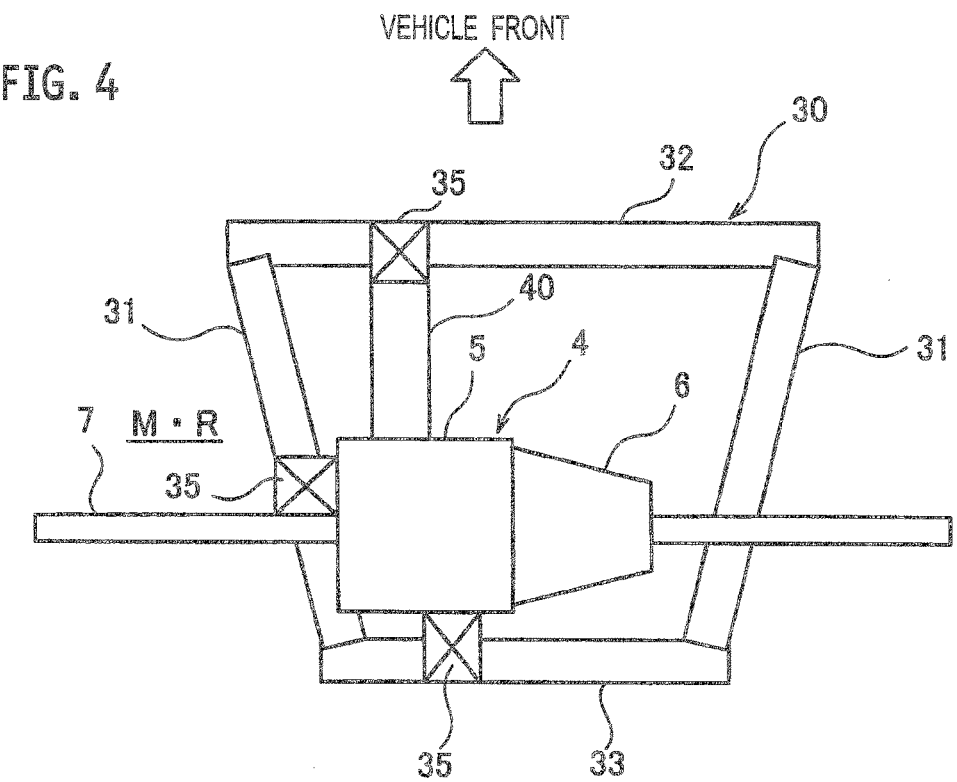
FIG. 4 is an explanatory plan view schematically illustrating the mounted state of the driving unit of FIG. 3.

As also illustrated in FIG. 4, the driving unit 4 is supported at three points through a mount bracket 40 (to be explained later) extending in the vehicle front-rear direction over a bottom side of the power-generating unit 1 and mount members 35 having vibration insulators. The three points are on the front cross member 32 through the mount bracket 40, rear cross member 33, and one of the side members 31, respectively.

According to the example illustrated in FIGS. 3 and 4, a front side of the driving motor 5 is supported through the mount bracket 40 and mount member 35 on the front cross member 32 in a vibration insulation manner. Rear and left sides of the driving motor 5 are supported through the mount members 35 on the rear cross member 33 and left side member 31, respectively, in a vibration insulation manner.

In this way, the driving unit 4 and the power-generating unit 1 are supported on the highly rigid side members 31 in such a manner to isolate vibration and allow pivotal motion. This prevents the intrinsic vibration characteristics thereof from interfering with each other, thereby causing no complicated vibration states, making antivibration designing easier, and realizing a good noise/vibration control ability.

Selective Distortion Structure

Figure 6:
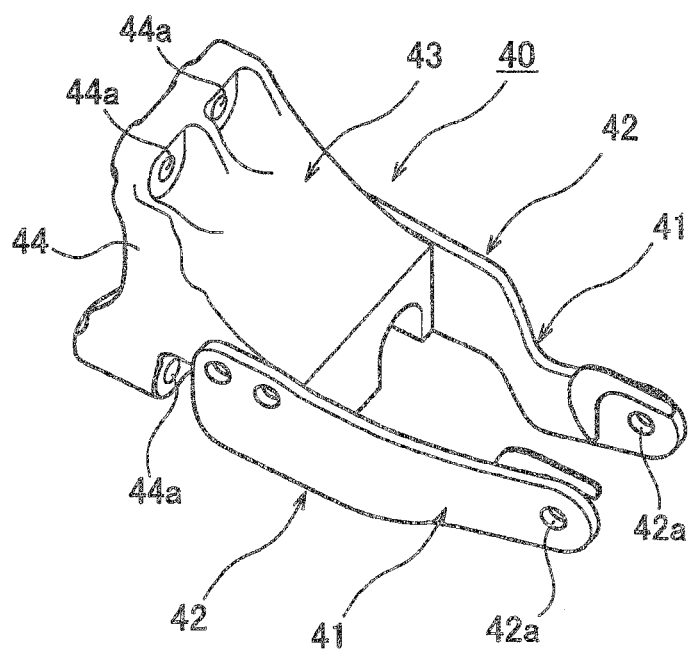
FIG. 6 is a perspective view illustrating a mount bracket according to an embodiment.
Figure 7:
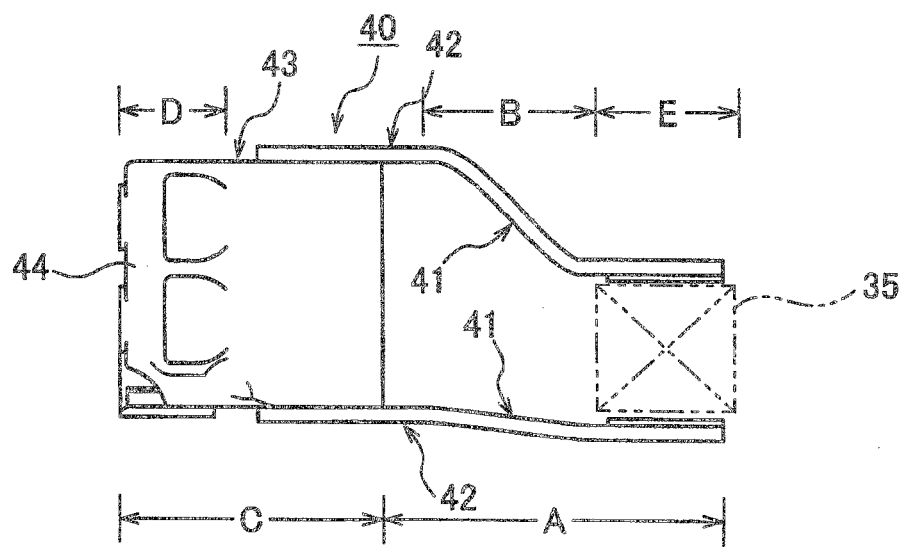
FIG. 7 is a plan view illustrating the mount bracket illustrated in FIG. 6.
Figure 8:
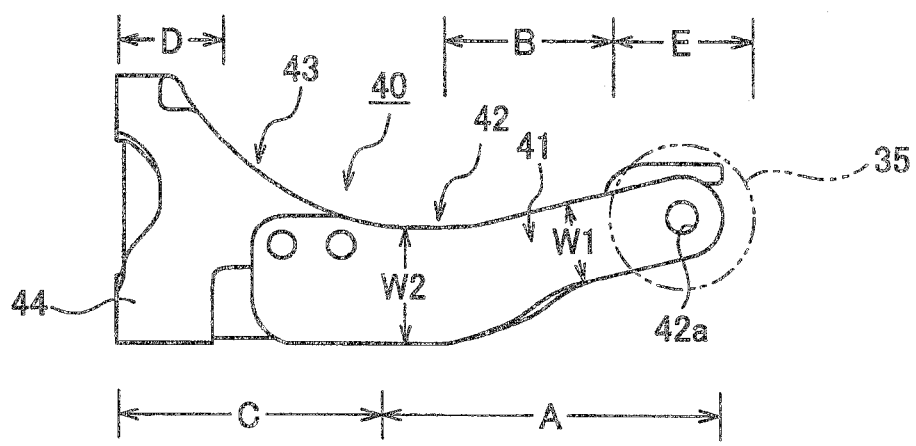
FIG. 8 is a side view illustrating the mount bracket illustrated in FIG. 6.

The mount bracket 40 has, as illustrated in FIGS. 6 to 8, a weakened part 41 that induces a buckling distortion with respect to an external dynamic input acting in the vehicle front-rear direction.

The weakened part 41 is configured, as will be explained later, to show high strength with respect to an external input acting in a vertical direction.

The weakened part 41 having such mechanical strength characteristics is structured by providing the mount bracket 40 with a plate section A whose plate surfaces are oriented toward the vehicle width direction and a bend section B that is defined in the plate section A and bends in the vehicle width direction when an external input equal to or greater than a predetermined value is applied thereto in the vehicle front-rear direction.

According to the embodiment, the mount bracket 40 is formed of a rigid section C and the plate section A joined to the rigid section C. An end of the rigid section C is an attaching section D to be attached to the driving unit 4, and the plate section A includes a mounting section E to be mounted on the sub-frame 30 (refer to FIGS. 7 and 8).

In the plate section A, a plate width W1 of the mounting section E is smaller than a plate width W2 on the rigid section C side. According to the embodiment, the plate section A is made of a pair of left and right metal plates 42 arranged away from each other in the vehicle width direction. The rigid section C may be a metal block 43 made by, for example, casting light metal such as aluminum or aluminum alloy.

A first end of each of the pair of left and right metal plates 42 is laid on a side face of the metal block 43 and is fixed thereto with a bolt or by welding.

Arranged across second ends of the metal plates 42 is the mount member 35 to form the mounting section E.

The mount member 35 arranged at the ends of the metal plates 42 is a conventional cylindrical bush-type insulator. The end of each metal plate 42 is provided with a shaft insertion hole 42a into which a shaft (not illustrated) is inserted. The mount member 35 is arranged at there and is joined to the front cross member 32 of the sub-frame 30.

On the other hand, the attaching section D of the metal block 43 is formed as a fastening section 44 having a plurality of bolt insertion holes 44a. A bearing face of the fastening section 44 is laid on a housing front face of the driving motor 5 and is fixed thereto with bolts.

According to the embodiment with the above-mentioned configuration, the driving unit 4 and power-generating unit 1 each having an intrinsic vibration characteristic are separately supported on the sub-frame 30 in such a manner to isolate vibration and allow pivotal motion of the units and are spaced away from each other in the vehicle front-rear direction. This makes it easy to work out antivibration designing for the driving unit 4 and power-generating unit 1 on the sub-frame 30 and avoid vibration interference between the units, thereby improving a noise/vibration control ability of the vehicle.

In particular, the driving unit 4 causes large torque fluctuations due to driving force fluctuations and reactive force from a road surface, to increase rotational moment around the output shaft 7 that is elongated in the vehicle width direction. The driving unit 4, however, is supported with the mount bracket 40 that extends over the power-generating unit 1 for a long span in the vehicle front-rear direction between the front cross member 32 and rear cross member 33 of the sub-frame 30, and therefore, the driving unit 4 is prevented from vibrating and allowed for pivotal motion. In this way, the driving unit 4 is provided with an improved antivibration supporting ability.

To extend the supporting span of the driving unit 4 in the vehicle front-rear direction with the use of the mount bracket 40, the mount bracket 40 must have an increased support strength. With the increased support strength, however, the mount bracket 40 may act as a brace when an external input is applied thereto in the vehicle front-rear direction at the time of, for example, a frontal collision of the vehicle.

For this, the embodiment provides the mount bracket 40 with the fragile part 41 so that, if an external input is applied to the mount bracket 40 in the vehicle front-rear direction at the time of, for example, a frontal collision of the vehicle, the mount bracket 40 may cause a buckling distortion from the weakened part 41 as a start point.

Namely, the weakened part 41 is structured to selectively collect stress when a dynamic external input is applied thereto in the vehicle front-rear direction. With the space set in the vehicle front-rear direction between the driving unit 4 and the power-generating unit 1 as a distortion margin, the mount bracket 40 promotes a buckling distortion to properly absorb the collision energy.

At the same time, the weakened part 41 is structured to show high strength against a vertical external input, and therefore, secures sufficient strength and rigidity against a large rotational moment around the output shaft 7 caused by torque fluctuations of the driving unit 4.

The mount bracket 40 according to the embodiment has the plate section A whose plate surfaces are oriented toward the vehicle width direction. In the plate section A, the bend section B forming the weakened part 41 is arranged to bend in the vehicle width direction when an external input equal to or greater than a predetermined value is applied thereto in the vehicle front-rear direction.

Accordingly, a vertical input is received by a vertically elongated sectional area of the plate section A where strength and rigidity are high, and an input in the vehicle front-rear direction induces a buckling distortion of the bend section B. In this way, the embodiment easily realizes both the above-mentioned securing strength and rigidity and producing buckling.

The mount bracket 40 is formed of the rigid section C and the plate section A connected thereto. An end of the rigid section C is provided with the attaching section D to be attached to the driving unit 4 and an end of the plate section A is provided with the mounting section E to be mounted on the sub-frame 30.

The mount bracket 40, therefore, has a joined structure having sufficient rigidity for the driving unit 4. The plate section A including the bend section B may be formed by, for example, pressing. This is structurally simple and advantageous in terms of cost.

In the plate section A, the plate width W1 on the mounting section E side is set to be smaller than the plate width W2 on the joining side to the rigid section C. Accordingly, the joining side of the plate section A adjacent to the rigid section C serves as a base to regularly cause a buckling distortion from the mounting section E side. This stabilizes a buckling distortion mode and properly absorbs energy. The plate section A is formed of the pair of left and right metal plates 42 spaced away from each other in the vehicle width direction. Between ends of the metal plates 42, the mount member 35 is arranged to form the mounting section E. This makes it easy to design the structures of the bend section B and mounting section E, thereby further saving cost. Although the embodiment arranges the driving unit 4 behind the power-generating unit 1, a mounting layout opposite to this is naturally possible.

Obviously, the present invention is applicable to a vehicle that defines a motor room MR in a rear part of the vehicle.

According to the present invention, the driving unit and power-generating unit each having a specific vibration characteristic are supported on the vehicle body member in such a manner to isolate vibration and allow pivotal motion of the units and are spaced away from each other in the vehicle front-rear direction. This makes it easy to work out antivibration designing and avoid vibration interference between the units, thereby improving a noise/vibration control ability of the vehicle.

In particular, the driving unit causes large torque fluctuations due to driving force fluctuations and reactive force from a road surface, to increase rotational moment around the output shaft that is elongated in the vehicle width direction. The driving unit, however, is supported with the mount bracket in such a manner to isolate vibration and allow pivotal motion. Here, the mount bracket is extended over the power-generating unit for a long span in the vehicle front-rear direction, thereby improving an antivibration supporting ability for the driving unit.

When an external input is applied to the mount bracket in the vehicle front-rear direction at the time of, for example, a collision of the vehicle, the mount bracket causes a buckling distortion from the weakened part as a start point. With the space set in the vehicle front-rear direction between the driving unit and the power-generating unit as a distortion margin, the mount bracket promotes a buckling distortion to properly absorb energy of the collision.

The invention claimed is:

1. A hybrid vehicle comprising:
   a driving unit powered by electric power, mounted in a motor room of the vehicle, and having an output shaft oriented in a vehicle width direction to output driving force for driving the vehicle;
   a power-generating unit arranged adjacent to one side of the driving unit, spaced away from the driving unit in a vehicle front-rear direction, and generating electric power for driving the driving unit;
   a vehicle body member separately supporting the driving unit and power-generating unit in the motor room in such a manner to isolate vibration and allow pivotal motion of the units; and
   a mount bracket extending in the vehicle front-rear direction, a first end of the mount bracket being connected to the driving unit, the mount bracket extending from the driving unit below and spaced from the power-generating unit and having a second end being supported on a front or rear side of the vehicle body member in such a manner to isolate vibration and allow pivotal motion, wherein
   the mount bracket has a weakened part that induces a buckling distortion with respect to an external input acting in the vehicle front-rear direction.

2. The hybrid vehicle according to claim 1, wherein the weakened part is configured to have greater mechanical strength against an external input acting in a vertical direction than against the external input acting in the vehicle front-rear direction.

3. The hybrid vehicle according to claim 1, wherein the mount bracket includes a plate section (A) whose plate surfaces are oriented toward a vehicle width direction and a bend section (B) defined in the plate section and serving as the weakened part to cause a buckling distortion in the vehicle width direction when external force equal to or greater than a predetermined value is applied thereto in the vehicle front-rear direction.

4. The hybrid vehicle according to claim 3, wherein:
   the mount bracket includes a rigid section (C) and the plate section (A) joined to an end of the rigid section; and
   an end of the rigid section includes an attaching section (D) to be attached to the driving unit and an end of the plate section includes a mounting section (E) to be mounted on the vehicle body member.

5. The hybrid vehicle according to claim 4, wherein the plate section is configured such that a plate width thereof on the rigid section side is greater than a plate width thereof on the mounting section side.

6. The hybrid vehicle according to claim 4, wherein the plate section is formed of a pair of metal plates arranged away from each other in the vehicle width direction and that a mount member to be connected to the vehicle body member is arranged between ends of the metal plates, to form the mounting section.

* * * * *